G. W. BISHUP.
BREECH LOADING ORDNANCE.
No. 791. Reissued Aug. 16, 1859.
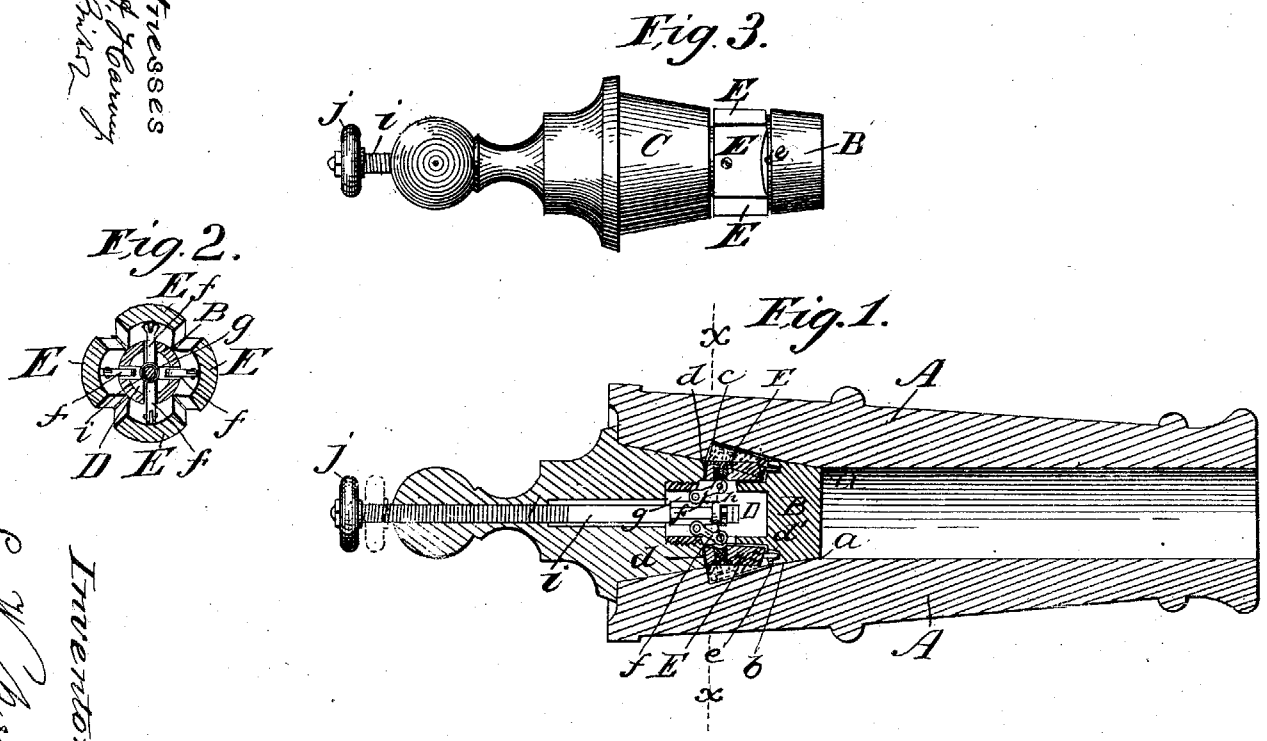
Witnesses
H. A. Harvey
Wm. Bishop
Inventor.
G. W. Bishop

UNITED STATES PATENT OFFICE.

G. W. BISHUP, OF BROOKLYN, NEW YORK.

IMPROVEMENT IN BREECH-LOADING ORDNANCE.

Specification forming part of Letters Patent No. 15,682, dated September 9, 1856; Reissue No. 791, dated August 16, 1859.

*To all whom it may concern:*

Be it known that I, G. W. BISHUP, of the city of Brooklyn, in the county of Kings and State of New York, have invented a new and useful Improvement in Breech-Loading Cannons and other Ordnance; and I do hereby declare that the following is a full, clear, and exact description thereof, reference being had to the accompanying drawings, making part of this specification, in which—

Figure 1 is a longitudinal central section of a breech-loading cannon with my improvements. Fig. 2 is a transverse section of the same in the line *x x*, shown in Fig. 1. Fig. 3 is a side view of the breech-pin detached.

Similar letters of reference indicate corresponding parts in the several figures.

My said invention relates to a method of opening the bore of a cannon at the breech for the reception of the charge, and then inclosing the charge by a movable breech-pin, which is internally secured by abutting pieces or braces to resist the force of the discharge; and to this end my invention consists in combining a movable breech-pin with the bore of a cannon by means of movable abutting braces or segments, which, when placed in one position, will permit the breech-pin to be taken out and inserted, and when placed in another position will lock the breech-pin in place and form abutments or braces, which will effectually resist the force of the discharge.

To enable others skilled in the art to make and use my invention, I will proceed to describe its construction and operation.

The gun A is bored truly and parallel from the muzzle to the line *a a*, (see Fig. 1,) where the face of the breech-pin meets the bore. From the point *a a* toward the rear of the gun the bore is enlarged gradually, or in a slightly-conical form, to *b b*, from whence it is again enlarged more suddenly than from *a*, and then suddenly contracted nearly to the same size as at *b b*, thus forming a conical groove, *b c*, all around the interior. From the line *c* the bore is again enlarged in a conical form to the rear extremity of the gun. The enlarged portion of the bore in the rear of the line *a a* constitutes the seat for the breech-pin.

B C is the breech-pin, which, in order to obtain a closed cavity, D, in its interior to receive the mechanism for operating its expanding or spreading segments, is made in two parts, of which the front part, B, which is bored out for some distance from its rear extremity to form the aforesaid cavity D, is screwed into the front of the rear part, C. The front portion of the part B is turned to a conical shape and ground to fit the part *a b* of the bore of the gun, and the part C is turned and ground to fit the conically-enlarged portion of the bore at the extreme rear of the gun.

Opposite to the conical groove *b c* there is a groove, *d d'*, turned in the exterior of the breech-pin, to receive the expanding segments E E. These segments, of which there may be three or more, are made of stout steel or iron, and are fitted to the groove *d d'* in the breech-pin, so that they will lie snugly within it, to allow the breech-pin to be inserted into the gun as far as desirable. They are confined to the breech-pin at the front of the groove *d d'* by means of pins *e e*, rigidly attached to them, and entering holes provided in the breech-pin to receive them, as shown in Fig. 1. These pins serve as hinges, upon which the segments are capable of expanding or spreading outward, so as to enter into the conical groove *b c* when the breech-pin is in its place. The segments are of such length as to reach from the front *d'* of the groove *d d'* in the breech-pin to the back part, *c*, of the groove *b c* in the gun when they are spread, while the breech-pin is in the gun, and their ends are so formed as to have a good solid bearing in the said grooves *d d'* and *b c*. The end *d'* of the groove *d d'* may be square with the axis of the pin; but the end *c* of the groove *b c* is tapered or curved in such a manner that by forcing out the segments in contact with it the segments will produce a slight drawing action, to draw the breech-pin tightly into the gun. The segments are shown in black outline in Fig. 1 drawn into the groove *d d'* in the breech-pin in condition for the insertion of the breech-pin into or its removal from the gun, and they are shown in red outline in the same figure expanded into the groove *b c*, in which condition they hold the breech-pin firmly in place and prevent it being driven back from the gun by the force of the explosion, which force is met directly by the segments and transmitted to the shoulder *c* at the back part of the groove *b c*. The expanding or spreading of the segments and the drawing of them into the breech-pin is effected by their connection with links *f f*, which work through slots *h h* in the sides of the cavity D of the breech-pin, and are connected with a loose collar, *g*, on a screw-rod, *i*, which works through the part C of the breech-pin, in one part of which is a female screw to receive the male screw on the rod. The collar *g* is fitted to a plain part of the screw-rod in such manner as to allow the latter to turn freely within it, but to have no longitudinal movement independently of it. Consequently by turning the screw, and thereby causing it to move longitudinally, the collar is moved longitudinally also, and by that means acts upon the links after the fashion of a toggle movement, and forces the segments outward from the breech-pin or draws them inward, according to the direction in which the screw is turned. The screw is provided with a wheel, *j*, or handle at the back part of the breech-pin, by which it is turned. The breech-pin, when the segments are drawn into the groove *d d'*, may be moved into and from its place in the gun by any suitable mechanical means, which do not require to be now described; and, although I have described the breech-pin as conical, I would have it understood that this is merely to facilitate the putting of it in and taking it out, and that my invention is not limited to the form of the breech-pin. Nor do I wish to be understood as limiting my claim of invention to the structure and arrangement of the abutting pieces or segments or to the mechanical connections by which they are moved, nor to the special relations of the segments with the breech-pin and bore of the cannon, as all these may be varied by the substitution of equivalents without changing the principle or mode of operation of my said invention so long as segments or abutting pieces are employed to lock the breech-pin when inserted, and to act as stops or braces to resist the force of the discharge.

What I claim as my invention, and desire to secure by Letters Patent, is—

Combining the movable breech-pin with the bore of the cannon by means of movable locking or abutting pieces or segments, substantially such as described, and which, after the breech-pin is inserted, are shifted and made to cross the joint of the breech-pin and bore, to hold the breech-pin against the force of the discharge, as set forth.

G. W. BISHUP.

Witnesses:

WM. H. BISHOP,

ANDREW DE LACY.